United States Patent
Liang et al.

(10) Patent No.: US 12,069,566 B2
(45) Date of Patent: Aug. 20, 2024

(54) METHOD FOR REPORTING INTERFACE AVAILABILITY, METHOD FOR INDICATING INTERFACE AVAILABILITY, AND DEVICE

(71) Applicant: VIVO MOBILE COMMUNICATION CO., LTD., Chang'an Dongguan (CN)

(72) Inventors: Jing Liang, Chang'an Dongguan (CN); Qian Zheng, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 489 days.

(21) Appl. No.: 17/378,213

(22) Filed: Jul. 16, 2021

(65) Prior Publication Data

US 2021/0345234 A1    Nov. 4, 2021

Related U.S. Application Data

(63) Continuation of application No. PCT/CN2020/072734, filed on Jan. 17, 2020.

(30) Foreign Application Priority Data

Jan. 18, 2019 (CN) .......................... 201910049884.2

(51) Int. Cl.
*H04W 48/16* (2009.01)
*H04W 76/10* (2018.01)

(52) U.S. Cl.
CPC ............ *H04W 48/16* (2013.01); *H04W 76/10* (2018.02)

(58) Field of Classification Search
CPC . H04W 48/16; H04W 76/10; H04W 72/1215; H04W 76/11; H04W 88/06; H04W 92/18; H04W 48/08; H04W 92/10
See application file for complete search history.

(56) References Cited

U.S. PATENT DOCUMENTS

| | | | |
|---|---|---|---|
| 2004/0132485 A1* | 7/2004 | Charney | H04W 76/10 455/552.1 |
| 2011/0274039 A1* | 11/2011 | Kim | H04L 45/124 370/328 |

(Continued)

FOREIGN PATENT DOCUMENTS

| | | |
|---|---|---|
| CN | 1933430 A | 3/2007 |
| CN | 101998495 A | 3/2011 |

(Continued)

OTHER PUBLICATIONS

Japanese First Office Action related to Application No. 2021-541564; reported on Aug. 2, 2022.

(Continued)

*Primary Examiner* — Kiet Tang
(74) *Attorney, Agent, or Firm* — von Briesen & Roper, s.c.

(57) ABSTRACT

This disclosure provides a method for reporting interface availability, a method for indicating interface availability, and a device. The reporting method includes: reporting, by an access AS layer, availability information of a target interface of a first terminal device to an upper layer; where the availability information includes at least one of first information, second information, third information, fourth information, and fifth information; the first information includes availability of the target interface; the second information includes link information that the availability of the target interface is applicable to; the third information includes time information that the availability of the target interface is applicable to; the fourth information includes information about a sidelink resource selection mode the availability of the target interface is applicable to; and the fifth information includes information about a current sidelink resource selection mode of the first terminal device.

17 Claims, 5 Drawing Sheets

An access AS layer reports availability information of a target interface of a first terminal device to an upper layer, where the availability information includes at least one of first information, second information, third information, fourth information, and fifth information; the first information includes availability of the target interface; the second information includes link information that the availability of the target interface is applicable to; the third information includes time information that the availability of the target interface is applicable to; the fourth information includes information about a sidelink resource selection mode the availability of the target interface is applicable; and the fifth information includes information about a current sidelink resource selection mode of the first terminal device — S101

(56) References Cited

U.S. PATENT DOCUMENTS

| | | | |
|---|---|---|---|
| 2013/0182635 A1 | 7/2013 | Zhao et al. | |
| 2015/0134510 A1 | 5/2015 | O'Donoghue | |
| 2016/0302248 A1 | 10/2016 | Yi et al. | |
| 2017/0079059 A1 | 3/2017 | Li et al. | |
| 2017/0353819 A1 | 12/2017 | Yin et al. | |
| 2018/0138965 A1 | 5/2018 | Martin | |
| 2018/0255505 A1 | 9/2018 | Thyagarajan et al. | |
| 2018/0317268 A1 | 11/2018 | Kim et al. | |
| 2018/0376525 A1* | 12/2018 | Feng | H04W 76/11 |
| 2019/0141764 A1 | 5/2019 | Fu et al. | |
| 2019/0335532 A1 | 10/2019 | Kim et al. | |
| 2020/0029384 A1 | 1/2020 | Hong et al. | |
| 2020/0107218 A1 | 4/2020 | Wang | |
| 2021/0006954 A1 | 1/2021 | Xu et al. | |

FOREIGN PATENT DOCUMENTS

| | | |
|---|---|---|
| CN | 102104913 A | 6/2011 |
| CN | 102457965 A | 5/2012 |
| CN | 105745947 A | 7/2016 |
| CN | 108260163 A | 7/2017 |
| CN | 107347214 A | 11/2017 |
| CN | 107466068 A | 12/2017 |
| CN | 107534482 A | 1/2018 |
| CN | 108990125 A | 12/2018 |
| RU | 2636753 C1 | 11/2017 |
| WO | 2018117775 A1 | 6/2018 |
| WO | 2018182286 A1 | 10/2018 |

OTHER PUBLICATIONS

Ericsson, "On Interface Selection", 3GPP TSG-RAN WG1 Meeting #95, Taipei, Taiwan, Jan. 21-25, 2019, R2-1901222.
International Search Report & Written Opinion related to Application No. PCT/CN2020/072734; reported on Apr. 2, 2020.
Chinese First Office Action related to Application No. 201910049884.2; reported on Aug. 31, 2020.
ZTE., "TP for V2X RAT selection of SL", 3GPP TSG-RAN WG2 Meeting #104, Spokane, USA, Nov. 12-16, 2018, R2-1818740.
Ericsson; "Path Selection Between Uu and PC5", 3GPP TSG-RAN WG3 Meeting #92, Nanjing, China, May 23-27, 2016, R3-161302.
Tencent; "Discussion on RAT LS on RAT Selection and PCT to TS 23.287", SA WG2 Meeting #130, Jan. 21-25, 2019, Kochi, India, S2-1900160.
Chinese Second Office Action related to Application No. 201910049884.2; reported on Mar. 25, 2021.
Samsung; "Coexistence of Uu and PC5 operation", 3GPP TSG RAN WG2 Meeting #95bis, Kaohsiung, Taiwan, Oct. 10-14, 2016, R2-166464.
Huawei, et al.; "Further discussions for PC5/Uu path selection for V2X", 3GPP TSG RAN WG2 Meeting #97, Athens, Greece, Feb. 13-17, 2017, R2-1701366.
Interdigital Inc.; "RAT selection for NR V2X", 3GPP RAN WG2 Meeting #104, Spokane, US, Nov. 12-16, 2018, R2-1816791.
Ericsson; "Interface and RAT selection", 3GPP TSG-RAN WG2 #104, Spokane, WA, USA, Nov. 12-16, 2018, R2-1817929.
Extended European Search Report related to Application No. 20741676.9; reported on Mar. 1, 2022.
First Russian Office Action related to Application No. 2021123585/07; reported on Apr. 26, 2022.
R2-1816994—Source: ZTE (Rapporteur) "Report of email discussion [103bis#40][NR/V2X] RAT selection for SL", Agenda item: 11.4.4, Document for: E-mail Discussion Report, 3GPP TSG-RAN WG2 Meeting #104, Spokane, USA, Nov. 12-16, 2018.

* cited by examiner

An access AS layer reports availability information of a target interface of a first terminal device to an upper layer, where the availability information includes at least one of first information, second information, third information, fourth information, and fifth information; the first information includes availability of the target interface; the second information includes link information that the availability of the target interface is applicable to; the third information includes time information that the availability of the target interface is applicable to; the fourth information includes information about a sidelink resource selection mode the availability of the target interface is applicable; and the fifth information includes information about a current sidelink resource selection mode of the first terminal device ⟋ S101

FIG. 1

An access AS layer reports availability information of a target interface of a first terminal device to an upper layer, where the availability information includes at least one of first information, second information, third information, fourth information, and fifth information; the first information includes availability of the target interface; the second information includes link information that the availability of the target interface is applicable to; the third information includes time information that the availability of the target interface is applicable to; the fourth information includes information about a sidelink resource selection mode the availability of the target interface is applicable; and the fifth information includes information about a current sidelink resource selection mode of the first terminal device — S101

Determine the availability of the target interface based on preset information, where the preset information includes at least one of sixth information, seventh information, eighth information, and ninth information; the sixth information includes connection information of the first terminal device and a target device; the seventh information includes information received from a network device and used for determining the availability of the target interface; the eighth information includes the information about the current sidelink resource selection mode of the first terminal device; and the ninth information includes a radio resource control RRC status of the first terminal device — S102

FIG. 2

METHOD FOR REPORTING INTERFACE AVAILABILITY, METHOD FOR INDICATING INTERFACE AVAILABILITY, AND DEVICE

CROSS-REFERENCE TO RELATED APPLICATIONS

The present application is a continuation application of International Application No. PCT/CN2020/072734 filed on Jan. 17, 2020, which claims priority of Chinese Patent Application No. 201910049884.2, filed in China on Jan. 18, 2019, both of which are incorporated herein by reference in their entireties.

TECHNICAL FIELD

This disclosure relates to the field of communications technologies, and more specifically, to a method for reporting interface availability, a method for indicating interface availability, and a device.

BACKGROUND

A sidelink (SL), also referred to sidelink or sidelink, is used for direct communication between terminal devices (UE) without a network device. In terms of SL resource selection, a terminal device in a long term evolution (LTE) system performs selection in two modes. A first mode (mode 1) is scheduled resource allocation (Scheduled resource allocation) mode in which a network device allocates SL resources to the terminal device. A second mode (mode 2) is autonomous resource selection (autonomous resource selection) mode in which UE autonomously selects SL resources, and the second mode further includes types a, b, c, and d. In terms of communication manner, communication over a sidelink in LTE is performed in a broadcast manner; and communication over a sidelink in a new radio (NR) system is performed in three communication manners: unicast, multicast, and broadcast. Unicast is a one-to-one (one to one) communication manner, and both multicast and broadcast are one-to-many (one to many) communication manners. However, in the broadcast manner, it is not required that a plurality of target terminal devices belong to one user group.

In a communication process, interfaces (interface) between different communication subjects are different. For example, an interface for direct communication between terminal devices is a PC5 interface, and an interface for communication between a terminal device and a network device is a user-to-network universal (Uu) interface.

At present, whether the terminal device chooses the PC5 interface or the Uu interface for communication is determined by an upper layer (up layer) of the terminal device. During interface selection, the upper layer needs to consider availability (availability) of different interfaces that is reported by an access (AS) layer of the terminal device. However, it is still not clear about what information is reported by the AS layer of the terminal device.

SUMMARY

Embodiments of this disclosure provide a method for reporting interface availability, a method for indicating interface availability, and a device, so as to determine information to be reported, thereby improving effectiveness of communication.

According to a first aspect, a method for reporting interface availability is provided, applied to a terminal device, where the method includes:

reporting, by an access AS layer, availability information of a target interface of the first terminal device to an upper layer; where the availability information includes at least one of first information, second information, third information, fourth information, and fifth information; the first information includes availability of the target interface; the second information includes link information that the availability of the target interface is applicable to; the third information includes time information that the availability of the target interface is applicable to; the fourth information includes information about a sidelink resource selection mode the availability of the target interface is applicable to; and the fifth information includes information about a current sidelink resource selection mode of the first terminal device.

According to a second aspect, a method for indicating interface availability is provided, applied to a network device, where the method includes:

transmitting indication information used for determining availability of a target interface of a first terminal device.

According to a third aspect, a first terminal device is provided, where the first terminal device includes:

a reporting module, configured to report, for an access AS layer, availability information of a target interface of the first terminal device to an upper layer; where the availability information includes at least one of first information, second information, third information, fourth information, and fifth information; the first information includes the availability of the target interface; the second information includes link information that the availability of the target interface is applicable to; the third information includes time information that the availability of the target interface is applicable to; the fourth information includes information about a sidelink resource selection mode the availability of the target interface is applicable to; and the fifth information includes information about a current sidelink resource selection mode of the first terminal device.

According to a fourth aspect, a network device is provided, where the network device includes:

a transmitting module, configured to transmit indication information used for determining availability of a target interface of a first terminal device.

According to a fifth aspect, a terminal device is provided, where the terminal device includes a memory, a processor, and a wireless communications program stored in the memory and capable of running on the processor, and when the wireless communications program is executed by the processor, the steps of the method according to the first aspect are implemented.

According to a sixth aspect, a network device is provided, where the network device includes a memory, a processor, and a wireless communications program stored in the memory and running on the processor, and when the wireless communications program is executed by the processor, the steps of the method according to the second aspect are implemented.

According to a seventh aspect, a computer-readable medium is provided, where a wireless communications program is stored in the computer-readable medium, and when the wireless communications program is executed by a processor, the steps of the method according to the first aspect or the second aspect are implemented.

In the embodiments of this disclosure, the AS layer of the first terminal device can report a plurality of types of availability information of the target interface of the first terminal device to the upper layer. In this case, availability information reported by the AS layer to the upper layer is clear to help the upper layer of the first terminal device to properly select a communications interface, thereby improving effectiveness of communication.

BRIEF DESCRIPTION OF DRAWINGS

To describe the technical solutions in the embodiments of this disclosure or in the related art more clearly, the following briefly describes the accompanying drawings required for describing the embodiments or the prior art. Apparently, the accompanying drawings in the following description show merely some embodiments recorded in this disclosure, and a person of ordinary skill in the art may still derive other drawings from these accompanying drawings without creative efforts.

FIG. 1 is a first schematic flowchart of a method for reporting interface availability according to an embodiment of this disclosure;

FIG. 2 is a second schematic flowchart of a method for reporting interface availability according to an embodiment of this disclosure;

DESCRIPTION OF EMBODIMENTS

Figure 3:
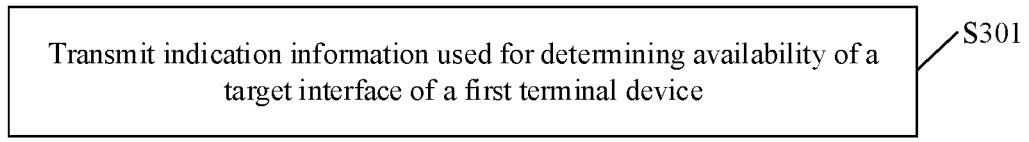
FIG. 3 is a schematic flowchart of a method for indicating interface availability according to an embodiment of this disclosure.

To make a person skilled in the art understand the technical solutions in this disclosure better, the following clearly and completely describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

It should be understood that the technical solutions in the embodiments of this disclosure can be applied to various communications systems, such as a global system for mobile communications (GSM), a code division multiple access (CDMA) system, wideband code division multiple access (WCDMA), a general packet radio service (GPRS), a long term evolution (LTE) system, an LTE frequency division duplex (FDD) system, an LTE time division duplex (TDD), a universal mobile telecommunications system (UMTS) or a worldwide interoperability for microwave access (WiMAX) communications system, a 5G system, or a new radio (NR) system.

A terminal device (UE) is also referred to as a mobile terminal (Mobile Terminal), a mobile terminal device, and the like, and may communicate with at least one core network through a radio access network (for example, RAN). The terminal device may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for providing an interface availability determining function for the terminal device. The network device may be a base station, and the base station may be a base station (BTS) in GSM or CDMA, may be a NodeB (NodeB) in WCDMA, or may be an evolved NodeB (evolutional Node B, eNB or e-NodeB) in LTE, a 5G NodeB (gNB), or a network-side device in a subsequent evolved communications system. However, the terms used do not constitute any limitation on the protection scope of this disclosure.

It should be noted that, during description of specific embodiments, sequence numbers of processes do not mean execution sequences, and the execution sequences of the processes should be determined based on functions and internal logic of the processes, and should not be construed as any limitation on the implementation processes in the embodiments of this disclosure.

It should be also noted that description objects connected by "and/or" in the embodiments of this application may be understood as at least one of the objects connected by "and/or".

The following describes a method for reporting interface availability applied to a terminal device with reference to FIG. 1.

FIG. 1 shows a method for reporting interface availability applied to a first terminal device according to an embodiment of this disclosure. As shown in FIG. 1, the method may include the following steps.

Step 101: An access AS layer reports availability information of a target interface of the first terminal device to an upper layer; where the availability information includes at least one of first information, second information, third information, fourth information, and fifth information; the first information includes availability of the target interface; the second information includes link information that the availability of the target interface is applicable to; the third information includes time information that the availability of the target interface is applicable to; the fourth information includes information about a sidelink resource selection mode the availability of the target interface is applicable to; and the fifth information includes information about a current sidelink resource selection mode of the first terminal device.

The target interface may include at least one of a Uu interface and a PC5 interface. The Uu interface is a user-to-network universal (Uu) interface, and the PC5 interface is an interface for direct communication between terminal devices.

The access (AS) layer is an AS layer of the first terminal device. Using a protocol stack of a 5G system as an example, a layer below a radio resource control (RRC) layer (including the RRC layer) is the AS layer, a layer above the RRC layer (excluding the RRC layer) is a non-access (NAS) layer, and the layer above the RRC layer is also referred to the upper layer of the AS layer.

The availability (availability) of the target interface includes available (available) or unavailable (not available). The following uses examples to describe a meaning of a target interface being available or unavailable. Using the target interface being the Uu interface as an example, the Uu interface being available means that service transmission can be performed through a connection between the first terminal device and a network device, and the Uu interface being unavailable means that service transmission cannot be performed through the connection between the first terminal device and the network device. Using the target interface being the PC5 interface as an example, the PC5 interface being available means that service transmission can be performed through a connection between the first terminal device and at least one second terminal device, and the PC5 interface being unavailable means that service transmission cannot be performed through the connection between the first terminal device and at least one second terminal device.

In this embodiment of the present invention, the first terminal device may be a source (Source) terminal device in a sidelink service. The second terminal device may be any terminal device or may be a destination (Destination) terminal device (also referred to as a peer terminal device); and the second terminal device may be either a peer terminal device to which the first terminal device transmits service data, or a peer terminal device to which the first terminal device transmits control information. The second terminal devices described below have similar meanings. A sidelink may be either of a unicast link and a multicast link.

It can be understood that the reported availability information includes at least one of the first information, the second information, the third information, the fourth information, and the fifth information; therefore, specific content of the reported availability information includes a plurality of combinations of the first information, the second information, the third information, the fourth information, and the fifth information. The following first describes the first information, the second information, the third information, the fourth information, and the fifth information separately.

The first information may specifically include the target interface being available or unavailable.

During specific reporting, one bit (bit) may be used to indicate the first information. For example, when the target interface is a PC5 interface, one bit may be used to indicate that the PC5 interface is available, or one bit may be used to indicate that the PC5 interface is unavailable. When the target interface is a Uu interface, one bit may be used to indicate that the Uu interface is available, or one bit may be used to indicate that the Uu interface is unavailable.

When the target interface includes the PC5 interface and the Uu interface, two bits may be used to jointly indicate the first information. Specifically, one of the two bits may be used to indicate that the PC5 interface is available or unavailable, and the remaining one of the two bits may be used to indicate that the Uu interface is available or unavailable. The two bits may be in an arbitrary order, or may be protocol-specified, pre-configured, or determined by the upper layer of the AS layer.

When there are a plurality of cases for a specific interface of the target interface, a plurality of bits may be used to indicate availability of the interface in the plurality of cases, and the plurality of bits may also be in an arbitrary order, or may be protocol-specified, pre-configured, or determined by the upper layer of the AS layer. For example, if the target interface is the PC5 interface, and PC5 has two cases, namely unicast and multicast, two bits may be used to jointly indicate the first information. Specifically, one of the two bits may be used to indicate that the PC5 interface is available or unavailable in the case of unicast, and the remaining one of the two bits is used to indicate that the PC5 interface is available or unavailable in the case of multicast; or the two bits may be in an arbitrary order. For another example, if the target interface is the PC5 interface, and PC5 has three cases, namely unicast, multicast, and broadcast, three bits may be used to jointly indicate the first information. Specifically, a first bit of the three bits may be used to indicate that the PC5 interface is available or unavailable in the case of unicast, a second bit of the three bits may be used to indicate that the PC5 interface is available or unavailable in the case of multicast, and a third bit of the three bits is used to indicate that the PC5 interface is available or unavailable in the case of broadcast; or the three bits may be in an arbitrary order.

Specific content included in the second information may be classified into many types, and is described below with reference to specific embodiments. Details are not described here.

The third information may specifically include time information that the availability of the target interface is applicable to. The time information may be defined by a timer (timer), or may be an absolute value of time. The time information is used to determine a validation time or invalidation time of the availability of the target interface.

Optionally, when the availability information includes the third information, the method shown in FIG. 1 may further include: determining the third information based on at least one of a protocol stipulation, configuration of the network device, and pre-configuration. That is, a value of the timer or the absolute value of time may be defined based on at least one of the protocol stipulation, the configuration of the network device, and the pre-configuration.

For example, it is assumed that the target interface is the PC5 interface, the availability of the PC5 interface is unavailable, and the value of the timer is 5 s. Then, after the timer expires, information about the PC5 interface being unavailable starts to take effect or stops to take effect. Alternatively, it is assumed that the target interface is the Uu interface, the availability of the Uu interface is unavailable, and the value of the timer is 5 s. Then, after the timer expires, information about the Uu interface being unavailable starts to take effect or stops to take effect.

The fourth information may specifically include the information about the sidelink resource selection mode the availability of the target interface is applicable to. The sidelink resource selection mode includes a scheduled resource allocation (Scheduled resource allocation) mode (mode 1) and an autonomous resource selection (autonomous resource selection) mode (mode 2), where mode 2 is divided into four types: 2a, 2b, 2c, and 2d.

For example, it is assumed that the target interface is PC5, the first information includes that the PC5 interface is unavailable, and the fourth information includes that the applicable sidelink resource selection mode of the PC5 interface being unavailable is mode 2. In other words, the availability information reported by the AS layer to the upper layer includes "PC5 not available+mode 2", which means that the PC5 interface is unavailable in mode 2.

For another example, it is assumed that the target interface is Uu, the first information includes that the Uu interface is unavailable, and the fourth information includes that the applicable sidelink resource selection mode of the Uu interface being unavailable is mode 1. In other words, the availability information reported by the AS layer to the upper layer includes "Uu not available+mode 1", which means that the Uu interface is unavailable in mode 1.

The fifth information specifically includes the information about the current sidelink resource selection mode of the first terminal device. The information about the current sidelink resource selection mode of the first terminal device may include a sidelink resource selection mode currently used by the first terminal device, and the currently used sidelink resource selection mode may be the foregoing mode 1 or mode 2. When the sidelink resource selection mode currently used by the first terminal device is mode 2, it may further be any one of 2a, 2b, 2c, and 2d.

In this embodiment of this specification, specific content of the first information, the second information, the third information, the fourth information, and the fifth information in the availability information are described by using separate examples, it should be understood that when the availability information that needs to be reported is more than one of the first information, the second information, the third information, the fourth information, and the fifth information, the specific availability information that needs to be reported may be determined in a combination manner.

According to a method for reporting interface availability in this embodiment of this disclosure, the AS layer of the first terminal device can report a plurality of types of availability information of the target interface of the first terminal device to the upper layer. In this case, interface availability information reported by the AS layer to the upper layer is clear to help the upper layer of the first terminal device to properly select a communications interface, thereby improving effectiveness of communication.

As shown in FIG. 2, in another embodiment, a method for reporting interface availability according to an embodiment of this disclosure may further include the following step.

Step 102: Determine the availability of the target interface based on preset information, where the preset information includes at least one of sixth information, seventh information, eighth information, and ninth information; the sixth information includes connection information of the first terminal device and a target device; the seventh information includes information received from a network device and used for determining the availability of the target interface; the eighth information includes the information about the current sidelink resource selection mode of the first terminal device; and the ninth information includes a radio resource control RRC status of the first terminal device.

The following uses a plurality of examples to describe how to determine the availability of the target interface based on the preset information and what specific content is included in the second information reported correspondingly.

Firstly, the first example to the fourth example below are used to describe the process of determining the availability of the PC5 interface based on the sixth information and the specific content of the second information reported correspondingly.

In the first example, if the target interface is the PC5 interface, the preset information includes the sixth information, the target device includes a second terminal device, and the information about the connection between the first terminal device and the target device is unicast connection information (that is, the connection between the first terminal device and the second terminal device is a unicast connection), then step 102 may include: in a case that a unicast connection is successfully established between the first terminal device and at least one of the second terminal devices and/or that a unicast connection is normal, determining that the target interface is available.

On this basis, optionally, the method for reporting interface availability shown in FIG. 1 or FIG. 2 may further include: when a first preset condition is satisfied, determining that the unicast connection between the first terminal device and the target device is successfully established and/or the unicast connection is normal.

The first preset condition includes, but is not limited to, at least one of the following:
the first terminal device receives a message of unicast connection establishment transmitted by the second terminal device;
the first terminal device receives acceptation information of direct communication transmitted by the second terminal device;
the first terminal device receives a message of unicast connection establishment coming from the second terminal device and transmitted by a network device;
the first terminal device receives acceptation information of direct communication coming from the second terminal device and transmitted by the network device; and
the unicast connection between the first terminal device and the second terminal device is normal.

In general cases, when a sidelink failure does not occur in the unicast connection between the first terminal device and the second terminal device, or no link switching occurs, it is considered that the unicast connection between the first terminal device and the second terminal devices is normal.

It should be noted that the successful establishment of the unicast connection may be understood as description of a unicast establishment process and result, and the unicast connection being normal may be considered as description of an already-established unicast connection.

In the second example, if the target interface is the PC5 interface, the preset information includes the sixth information, the target device includes a second terminal device, and the information about the connection between the first terminal device and the target device is unicast connection information (that is, the connection between the first terminal device and the second terminal device is a unicast connection), then step 102 may include: in a case that a unicast connection fails to be established between the first terminal device and at least one of the second terminal devices and/or that a unicast connection is abnormal, determining that the target interface is unavailable.

On this basis, optionally, the method for reporting interface availability shown in FIG. 1 or FIG. 2 may further include: when a second preset condition is satisfied, determining that the unicast connection between the first terminal device and the target device fails to be established and/or the unicast connection is abnormal.

The second preset condition includes, but is not limited to, at least one of the following:
the first terminal device receives a unicast connection reject message transmitted by at least one of the second terminal devices;
the first terminal device receives a unicast connection reject message coming from at least one of the second terminal devices and transmitted by a network device;
the first terminal device receives a direct communication reject message transmitted by at least one of the second terminal devices;
the first terminal device receives a direct communication reject message coming from at least one of the second terminal devices and transmitted by the network device;
there is no unicast connection between the first terminal device and at least one of the second terminal devices;

the first terminal device releases an established unicast connection to at least one of the second terminal devices;

the first terminal device receives a unicast connection release message transmitted by at least one of the second terminal devices;

the first terminal device receives a unicast connection release message coming from at least one of the second terminal devices and transmitted by the network device;

a link failure occurs in the unicast connection between the first terminal device and at least one of the second terminal devices;

the unicast connection between the first terminal device and at least one of the second terminal devices is switched; and parameter negotiation of AS layer between the first terminal device and at least one of the second terminal devices fails.

It should be noted that the failed establishment of the unicast connection may be understood as description of a unicast establishment process and result, and the unicast connection being abnormal may be considered as description of an already-established unicast connection.

Optionally, on the basis of the foregoing first and second examples, if the availability information reported in step 101 includes second information, the second information may specifically include, but is not limited to, at least one of the following: a link type that the availability of the target interface is applicable to is unicast link, and link information about a unicast link corresponding to the availability of the target interface.

The information about the unicast link includes at least one of a link ID of the unicast link, a data bearer ID of the unicast link, a control bearer ID of the unicast link, an ID of the first terminal device, and an ID of the second terminal device.

For example, if it is determined based on the first example that the PC5 interface is available, the first information in the availability information may include that the PC5 interface is available, and the second information in the availability information may include that the PC5 interface being available is applicable to unicast links. Link information of a unicast link corresponding to the PC5 interface being available includes information such as a link ID of the unicast link, a data bearer ID of the unicast link, a control bearer ID of the unicast link, an ID of the first terminal device, and an ID of the second terminal device.

The ID of the first terminal device or the ID of the second terminal device may include at least one of the following information: an upper layer (upper layer) ID of the AS layer, a layer 2 (L2) ID, a physical layer ID, an international mobile user identification number (IMSI), a temporary mobile subscriber identity (5G-S-TMSI), a source (Source) terminal device ID, and a destination (Destination) terminal device ID, and the like.

In the third example, if the target interface is the PC5 interface, the preset information includes the sixth information, the target device includes at least one second terminal device, and the information about the connection between the first terminal device and the target device is multicast connection information (that is, the connection between the first terminal device and the second terminal device is a multicast connection), then step 102 may include: in a case that a multicast connection is successfully established between the first terminal device and at least one of the second terminal devices and/or that a multicast connection is normal, determining that the target interface is available.

On this basis, optionally, the method for reporting interface availability shown in FIG. 1 or FIG. 2 may further include: when a third preset condition is satisfied, determining that the multicast connection between the first terminal device and at least one of the second terminal devices is successfully established and/or the multicast connection is normal.

The third preset condition includes, but is not limited to, at least one of the following:

the first terminal device receives a message of unicast connection establishment transmitted by at least one of the second terminal devices;

the first terminal device receives acceptation information of direct communication transmitted by at least one of the second terminal devices;

the first terminal device receives a message of unicast connection establishment coming from at least one of the second terminal devices and transmitted by the network device;

the first terminal device receives acceptation information of direct communication coming from at least one of the second terminal devices and transmitted by the network device; and the multicast connection between the first terminal device and at least one of the second terminal devices is normal.

In general cases, if no sidelink failure or switching occurs between the first terminal device and at least one of the second terminal devices, it is considered that the multicast connection between the first terminal and at least one of the terminal devices is normal.

It should be noted that the successful establishment of the multicast connection may be understood as description of a multicast establishment process and result, and the multicast connection being normal may be considered as description of an already-established multicast connection.

In the fourth example, if the target interface is the PC5 interface, the preset information includes the sixth information, the target device includes at least one second terminal device, and the information about the connection between the first terminal device and the target device is multicast connection information (that is, the connection between the first terminal device and the second terminal device is a multicast connection), then step 102 may include: in a case that a multicast connection fails to be established between the first terminal device and at least one of the second terminal devices and/or that a multicast connection is abnormal, determining that the target interface is unavailable.

On this basis, optionally, the method for reporting interface availability shown in FIG. 1 or FIG. 2 may further include: when a fourth preset condition is satisfied, determining that the multicast connection between the first terminal device and at least one of the second terminal devices fails to be established and/or the multicast connection is abnormal.

The fourth preset condition includes, but is not limited to, at least one of the following:

the first terminal device receives a multicast connection reject message transmitted by at least one of the second terminal devices;

the first terminal device receives a multicast connection reject message coming from at least one of the second terminal devices and transmitted by a network device;

the first terminal device receives a direct communication reject message transmitted by at least one of the second terminal devices;

the first terminal device receives a direct communication reject message coming from at least one of the second terminal devices and transmitted by the network device;

there is no already-established multicast connection between the first terminal device and at least one of the second terminal devices;

the first terminal device releases an established multicast connection to at least one of the second terminal devices;

the first terminal device receives a multicast connection release message transmitted by at least one of the second terminal devices;

the first terminal device receives a multicast connection release message coming from at least one of the second terminal devices and transmitted by the network device;

a link failure occurs in the multicast connection between the first terminal device and at least one of the second terminal devices;

the multicast connection between the first terminal device and at least one of the second terminal devices is switched; and parameter negotiation of AS layer between the first terminal device and at least one of the second terminal devices fails.

It should be noted that the failed establishment of the multicast connection may be understood as description of a multicast establishment process and result, and the multicast connection being abnormal may be considered as description of an already-established multicast connection.

Optionally, on the basis of the foregoing third and fourth examples, if the availability information reported in step 101 includes second information, the second information may specifically include, but is not limited to, at least one of the following: a link type that the availability of the target interface is applicable to is multicast link, and link information about a multicast link corresponding to the availability of the target interface.

The information about the multicast link includes at least one of a link ID of the multicast link, a data bearer ID of the multicast link, a control bearer ID of the multicast link, an ID of the first terminal device, and an ID of at least one of the second terminal devices.

For example, if it is determined based on the third example that the PC5 interface is available, the first information in the availability information may include that the PC5 interface is available, and the second information in the availability information may include that the PC5 interface being available is applicable to multicast links. Link information of a multicast link corresponding to the PC5 interface being available includes information such as a link ID of the multicast link, a data bearer ID of the multicast link, a control bearer ID of the multicast link, an ID of the first terminal device, and an ID of the second terminal device in the multicast link.

As described above, the ID of the first terminal device or the ID of the second terminal device may include at least one of the following information: an upper layer ID of the AS layer, a layer 2 ID, a physical layer ID, an IMSI, a 5G-S-TMSI, a source terminal device ID, and a destination terminal device ID.

It should be noted that in the foregoing first to fourth examples, the first terminal device may be a source (Source) terminal device in a sidelink service. The second terminal device may be any terminal device; or the second terminal device may be a destination (Destination) terminal device (also referred to as a peer terminal device); or the second terminal device may be either a peer terminal device to which the first terminal device transmits service data, or a peer terminal device to which the first terminal device transmits control information.

The following uses the fifth example and the sixth example to describe how to determine the availability of the Uu interface based on the sixth information and what specific content is included in the second information reported correspondingly.

In the fifth example, if the target interface is the Uu interface, the preset information includes the sixth information, the target device includes a network device, and the information about the connection between the first terminal device and the target device is RRC connection information, step 102 may include: in a case that an RRC connection is successfully established between the first terminal device and the network device and/or that an RRC connection is normal, determining that the target interface is available.

Correspondingly, the method shown in FIG. 1 or FIG. 2 may further include: when a fifth preset condition is satisfied, determining that the RRC connection is successfully established between the first terminal device and the network device and/or the RRC connection is normal.

The fifth preset condition includes, but is not limited to, at least one of the following:

the first terminal device receives a message 4(msg4) transmitted by the network device;

the first terminal device receives a message B transmitted by the network device;

the first terminal device receives an RRC connection establishment message transmitted by the network device; and the first terminal device receives a paging (paging) message transmitted by the network device.

It should be noted that message 4 is a message received in the fourth step of the 4-step random access process, the message B is a message received in the second step of the 2-step random access process, and the paging (paging) message may be a paging message of a radio access network (RAN), or may be a paging message of a core network.

It should be noted that the successful establishment of the RRC connection may be understood as description of an RRC establishment process and result, and the RRC connection being normal may be considered as description of an already-established RRC connection.

In the sixth example, if the target interface is the Uu interface, the preset information includes the sixth information, the target device includes a network device, and the information about the connection between the first terminal device and the target device is RRC connection information, step 102 may include: in a case that an RRC connection fails to be established between the first terminal device and the network device and/or that an RRC connection is abnormal, determining that the target interface is unavailable.

Correspondingly, the method shown in FIG. 1 or FIG. 2 may further include: when a sixth preset condition is satisfied, determining that the RRC connection fails to be established between the first terminal device and the network device and/or the RRC connection is abnormal.

The sixth preset condition includes, but is not limited to, at least one of the following:

the first terminal device receives a reject message of RRC connection transmitted by the network device;

the first terminal device receives control information of cell access transmitted by the network device;

the first terminal device receives prohibit information of cell access transmitted by the network device;

the first terminal device receives an RRC connection release message transmitted by the network device;

a radio link failure occurs between the first terminal device and the network device;

the first terminal device triggers a cell handover procedure;

a beam failure occurs on the first terminal device; and the first terminal device triggers a beam failure recovery process.

It should be noted that the failed establishment of the RRC connection may be understood as description of an RRC establishment process and result, and the RRC connection being abnormal may be considered as description of an already-established RRC connection.

Optionally, on the basis of the foregoing fifth and sixth examples, if the availability information reported in step 101 includes the second information, the second information may specifically include RRC status information of the first terminal device. The RRC status may include a connected state (connected), an idle state (idle), or an inactive state (Inactive). Similar to reporting of the first information, during specific reporting, one bit may alternatively be used to indicate the RRC status information of the first terminal device.

On this basis, for example, if the availability information reported in step 101 includes the first information and the second information, where the first information specifically includes that the Uu interface is unavailable, and the second information includes that the RRC status of the first terminal device is an idle state, that is, the availability information includes "Uu not available+idle", it means that the RRC connection of the first terminal device is in the idle state, and the Uu interface of the first terminal device is unavailable. In this case, the RRC status of the first terminal device needs to be triggered to enter the connected state, so as to make the Uu interface available; if the availability information includes "Uu not available+connected", it means that the Uu interface is completely unavailable.

The following uses the seventh example to describe the process of determining the availability of the Uu interface based on the seventh information received from the network device.

In the seventh example, the target interface is a Uu interface, the preset information includes the seventh information, and the seventh information includes, but is not limited to, at least one of the following: first scheduling information from the network device, first configuration information from the network device, and second configuration information from the network device.

The first scheduling information is used to schedule a sidelink resource for the first terminal device, and the first scheduling information carries information used for determining the availability of the target interface.

That is, when the network device performs sidelink resource scheduling for the first terminal device in mode 1 by using the first scheduling information, one or more extra bits may be added to the first scheduling information to indicate that the Uu interface is available or unavailable.

The first configuration information is used to indicate the availability of the target interface.

That is, the network device may use special configuration information to indicate to the first terminal device that the Uu interface is available or unavailable, which may be specifically indicated by one bit.

The second configuration information is used to configure at least one of a sidelink resource pool and a bandwidth part (BWP) for the first terminal device, and the second configuration information carries information used for determining the availability of the target interface.

That is, the network device may carry, in the configuration information used for configuring the sidelink resource pool and/or the BWP for the first terminal device, information used for determining the availability of the Uu interface.

It can be understood that after receiving the first scheduling information, the first configuration information, and the second configuration information from the network device, the first terminal device may directly determine that the Uu interface is available or unavailable.

Certainly, the network device may alternatively use other configuration information to carry information used for determining the availability of the target interface, which is not limited in this disclosure.

The following uses the eighth example to describe the process of determining the availability of the PC5 interface based on the seventh information received from the network device.

In the eighth example, the target interface is a PC5 interface, the preset information includes the seventh information, and the seventh information includes, but is not limited to, at least one of the following: second scheduling information from the network device, third configuration information from the network device, fourth configuration information from the network device, fifth configuration information from the network device, and sixth configuration information from the network device.

The second scheduling information is used to schedule a sidelink resource for the first terminal device, and the second scheduling information carries information used for determining the availability of the target interface.

That is, when the network device performs sidelink resource scheduling for the first terminal device in mode 1 by using the second scheduling information, one or more extra bits may be added to the second scheduling information to indicate that the PC5 interface is available or unavailable.

The third configuration information is used to indicate the availability of the target interface.

That is, the network device may use special configuration information to indicate to the first terminal device that the PC5 interface is available or unavailable, which may be specifically indicated by one bit.

The fourth configuration information is used to configure a preset resource for the first terminal device, and the fourth configuration information carries information used for determining the availability of the target interface.

That is, the network device may carry, in the configuration information used for configuring the sidelink resource pool and/or the BWP for the first terminal device, information used for determining the availability of the PC5 interface.

It can be understood that after receiving the second scheduling information, the third configuration information, and the fourth configuration information from the network device, the first terminal device may directly determine that the PC5 interface is available or unavailable.

A manner in which the network device uses at least one of the second scheduling information, the third configuration information, and the fourth configuration information to indicate that the PC5 interface is available or unavailable may be considered as an explicit indication manner. A manner in which the network device uses the fifth configuration information and/or the sixth configuration information to indicate that the PC5 interface is available or unavailable may be considered as an implicit indication manner, because the configuration information does not directly carry the information used for determining the availability of the PC5 interface.

For the fifth configuration information, in a case that the fifth configuration information carries information used for configuring a preset resource, the fifth configuration information may be used to determine that the target interface is available; and in a case that the fifth configuration information does not carry information used for configuring a preset resource, the fifth configuration information may be used to determine that the target interface is unavailable. That is, whether the fifth configuration information carries the information for configuring the preset resource may be used to indirectly indicate whether the PC5 interface is available or unavailable. Specifically, if the information for configuring the preset resource is carried, the fifth configuration information may be used to indicate that the PC5 interface is available; if the information for configuring the preset resource is not carried, the fifth configuration information may be used to indicate that the PC5 interface is unavailable.

Certainly, the reverse is also feasible. That is, in a case that the fifth configuration information carries the information for configuring the preset resource, the fifth configuration information may be used to determine that the target interface is unavailable; and in a case that the fifth configuration information does not carry the information for configuring the preset resource, the fifth configuration information may be used to determine that the target interface is available.

The sixth configuration information is used to configure a preset resource for the first terminal device; in a case that communication between the first terminal device and the second terminal device is unable to be implemented by using the preset resource configured in the sixth configuration information, the sixth configuration information is used to determine that the target interface is unavailable; and in a case that communication between the first terminal device and the second terminal device is able to be implemented by using the preset resource configured in the sixth configuration information, the sixth configuration information is used to determine that the target interface is available.

That is, if a resource configured by using the resource configuration information carried in the sixth configuration information is able to implement communication between the first terminal device and the second terminal device, it means that the PC5 interface is available. If a resource configured by using the resource configuration information carried in the sixth configuration information is unable to implement communication between the first terminal device and the second terminal device, it means that the PC5 interface is unavailable.

In general cases, when the network device uses the sixth configuration information to configure, for the first terminal device, a preset resource different from that of the second terminal device, communication between the first terminal device and the second terminal device cannot be implemented as a result.

The preset resource includes at least one of a sidelink resource pool and a BWP.

It can be understood that after receiving the fifth configuration information and the sixth configuration information from the network device, the first terminal device may determine that the PC5 interface is available or unavailable.

In addition, because no extra bits are added to the fifth configuration information and the sixth configuration information, communication resources can also be reduced.

It should be noted that the first configuration information and the second configuration information described in the seventh example, and the third configuration information to the sixth configuration information described in the eighth example may be dedicated signaling transmitted by the network device, or may be broadcast messages transmitted by the network device.

It should be further noted that the fourth configuration information to the sixth configuration information described in the eighth example may be different configuration information, or may be the same configuration information.

The following uses the ninth example to describe the process of determining the availability of the target interface based on the eighth information.

In the ninth example, if the preset information includes the eighth information, step 102 may include: determining the availability of the target interface based on a mapping relationship between the eighth information and the availability of the target interface. The eighth information includes a current sidelink resource selection mode of the first terminal device.

The ninth example may be used to determine the availability of the Uu interface, or may be used to determine the availability of the PC5 interface.

For example, a mapping relationship between the Uu interface and the current sidelink resource selection mode of the first terminal device may be preset, so as to determine the availability of the Uu interface based on the mapping relationship. Specifically, for example, if the preset mapping relationship includes "Uu available+mode 1", it indicates that when the current sidelink resource selection mode of the first terminal device is mode 1, the Uu interface of the first terminal device is available.

For another example, a mapping relationship between the PC5 interface and the current sidelink resource selection mode of the first terminal device may be preset, so as to determine the availability of the PC5 interface based on the mapping relationship. Specifically, for example, if the preset mapping relationship includes "PC5 available+mode 2", it indicates that when the current sidelink resource selection mode of the first terminal device is mode 2, the PC5 interface of the first terminal device is available; and so on. Examples are not provided one by one.

The following uses the tenth example to describe the process of determining the availability of the target interface based on the ninth information.

In the tenth example, if the preset information includes the ninth information, step 102 may include: determining the availability of the target interface based on a mapping relationship between the ninth information and the availability of the target interface.

The ninth information may include an RRC status of the first terminal device, where the RRC status may include a connected state (connected), an idle state (idle), or an inactive state (Inactive).

The tenth example may be used to determine the availability of the Uu interface, or may be used to determine the availability of the PC5 interface.

For example, a mapping relationship between the Uu interface and the RRC status of the first terminal device may be preset, so as to determine the availability of the Uu interface based on the mapping relationship.

Specifically, for example, if the preset mapping relationship includes "Uu available+connected", it indicates that when the RRC status of the first terminal device is the connected state, the Uu interface of the first terminal device is available; or if the preset mapping relationship includes "Uu available+idle/Inactive", it indicates that when the RRC status of the first terminal device is the idle state or the inactive state, the Uu interface of the first terminal device is available; or if the preset mapping relationship includes "Uu available+idle/Inactive+suitable cell", it indicates that when the RRC status of the first terminal device is the idle state or the inactive state and the first terminal device camps in a suitable cell, the Uu interface of the first terminal device is available; and so on.

For another example, if the preset mapping relationship includes "Uu not available+idle/Inactive", it indicates that when the RRC status of the first terminal device is the idle state or the inactive state, the Uu interface of the first terminal device is unavailable; or if the preset mapping relationship includes "Uu not available+idle/Inactive+acceptable cell", it indicates that when the RRC status of the first terminal device is the idle state or the inactive state and the first terminal device camps in an acceptable cell, the Uu interface of the first terminal device is unavailable; and so on.

For still another example, a mapping relationship between the PC5 interface and the RRC status of the first terminal device may be preset, so as to determine the availability of the PC5 interface based on the mapping relationship. Specifically, for example, if the preset mapping relationship includes "PC5 not available+idle", it indicates that when the RRC status of the first terminal device is the idle state, the PC5 interface of the first terminal device is unavailable; and so on.

It can be understood that there are many types of mapping relationships between the availability of the target interface and the RRC status of the first terminal device, which is not described herein by using examples one by one.

It should be noted that although the foregoing uses ten examples to describe how to determine the availability of the target interface separately based on the sixth information, the seventh information, the eighth information, and the ninth information, it should be understood that in actual applications, the availability of the target interface may be determined based on a plurality of pieces of information in the sixth information, the seventh information, the eighth information, and the ninth information.

The embodiment shown in FIG. 2 provides a method for reporting interface availability. Detailed availability information can be reported, and a specific manner of determining the availability of the target interface is also provided; therefore, the problem of how to determine the availability of the target interface can be resolved.

Optionally, on the basis of any one of the foregoing embodiments, if the target interface is PC5, a method for reporting interface availability provided in this disclosure may further include: reporting, to the upper layer, the availability of the target interface for communication performed in a broadcast manner by the first terminal device.

It should be additionally noted that the availability information reported by the AS layer of the first terminal device to the upper layer may be any combination of the first information, the second information, the third information, the fourth information, and the fifth information.

It should be additionally noted that when the AS layer of the first terminal device reports the first information to the upper layer, if the target interface includes the PC5 interface and the Uu interface, two bits may be used to jointly indicate the first information. Specifically, one of the two bits may be used to indicate that the PC5 interface is available or unavailable, and the remaining one of the two bits may be used to indicate that the Uu interface is available or unavailable. The two bits may be in an arbitrary order, or may be protocol-specified, pre-configured, or determined by the upper layer of the AS layer.

During specific reporting, if there are a plurality of cases for a specific interface of the target interface, a plurality of bits may be used to indicate availability of the interface in the plurality of cases, and the plurality of bits may also be in an arbitrary order, or may be protocol-specified, pre-configured, or determined by the upper layer of the AS layer. For example, if the target interface is the PC5 interface, and PC5 has two cases, namely unicast and multicast, two bits may be used to jointly indicate the first information. Specifically, one of the two bits may be used to indicate that the PC5 interface is available or unavailable in the case of unicast, and the remaining one of the two bits is used to indicate that the PC5 interface is available or unavailable in the case of multicast; or the two bits may be in an arbitrary order. For another example, if the target interface is the PC5 interface, and PC5 has three cases, namely unicast, multicast, and broadcast, three bits may be used to jointly indicate the first information. Specifically, a first bit of the three bits may be used to indicate that the PC5 interface is available or unavailable in the case of unicast, a second bit of the three bits may be used to indicate that the PC5 interface is available or unavailable in the case of multicast, and a third bit of the three bits is used to indicate that the PC5 interface is available or unavailable in the case of broadcast; or the three bits may be in an arbitrary order.

The foregoing describes the method for reporting interface availability applied to the first terminal device, and the following describes a method for indicating interface availability applied to a network device with reference to FIG. 3.

As shown in FIG. 3, an embodiment of this disclosure further provides a method for indicating interface availability applied to a network device. The method includes the following steps.

Step 301: Transmit indication information used for determining availability of a target interface of a first terminal device.

The target interface includes at least one of a Uu interface and a PC5 interface. The availability of the target interface includes available or unavailable.

In an example, if the target interface includes a Uu interface, the indication information includes at least one of first scheduling information, first configuration information, and second configuration information.

The first scheduling information is used to schedule a sidelink resource for the first terminal device, and the first scheduling information carries information used for determining the availability of the target interface.

The first configuration information is used to indicate the availability of the target interface.

The second configuration information is used to configure at least one of a sidelink resource pool and a bandwidth part BWP for the first terminal device, and the second configuration information carries information used for determining the availability of the target interface.

It can be understood that after receiving the first scheduling information, the first configuration information, and the second configuration information from the network device, the first terminal device may directly determine that the Uu interface is available or unavailable.

In another example, if the target interface is a PC5 interface, the indication information includes at least one of second scheduling information, third configuration information, fourth configuration information, fifth configuration information, and sixth configuration information.

The second scheduling information is used to schedule a sidelink resource for the first terminal device, and the second scheduling information carries information used for determining the availability of the target interface.

The third configuration information is used to indicate the availability of the target interface.

The fourth configuration information is used to configure a preset resource for the first terminal device, and the fourth configuration information carries information used for determining the availability of the target interface.

It can be understood that after receiving the second scheduling information, the third configuration information, and the fourth configuration information from the network device, the first terminal device may directly determine that the PC5 interface is available or unavailable.

A manner in which the network device uses at least one of the second scheduling information, the third configuration information, and the fourth configuration information to indicate that the PC5 interface is available or unavailable may be considered as an explicit indication manner. A manner in which the network device uses the fifth configuration information and/or the sixth configuration information to indicate that the PC5 interface is available or unavailable may be considered as an implicit indication manner, because the configuration information does not directly carry the information used for determining the availability of the PC5 interface.

For the fifth configuration information, in a case that the fifth configuration information carries information used for configuring a preset resource, the fifth configuration information may be used to determine that the target interface is available; and in a case that the fifth configuration information does not carry information used for configuring a preset resource, the fifth configuration information may be used to determine that the target interface is unavailable.

Certainly, the reverse is also feasible. That is, in a case that the fifth configuration information carries the information for configuring the preset resource, the fifth configuration information may be used to determine that the target interface is unavailable; and in a case that the fifth configuration information does not carry the information for configuring the preset resource, the fifth configuration information may be used to determine that the target interface is available.

The sixth configuration information is used to configure a preset resource for the first terminal device; in a case that communication between the first terminal device and the second terminal device is unable to be implemented by using the preset resource configured in the sixth configuration information, the sixth configuration information is used to determine that the target interface is unavailable; and in a case that communication between the first terminal device and the second terminal device is able to be implemented by using the preset resource configured in the sixth configuration information, the sixth configuration information is used to determine that the target interface is available.

That is, if a resource configured by using the resource configuration information carried in the sixth configuration information is able to implement communication between the first terminal device and the second terminal device, it means that the PC5 interface is available. If a resource configured by using the resource configuration information carried in the sixth configuration information is unable to implement communication between the first terminal device and the second terminal device, it means that the PC5 interface is unavailable.

In general cases, when the network device uses the sixth configuration information to configure, for the first terminal device, a preset resource different from that of the second terminal device, communication between the first terminal device and the second terminal device cannot be implemented as a result.

The preset resource includes at least one of a sidelink resource pool and a BWP.

It can be understood that after receiving the fifth configuration information and the sixth configuration information from the network device, the first terminal device may determine that the PC5 interface is available or unavailable. In addition, because no extra bits are added to the fifth configuration information and the sixth configuration information, communication resources can also be reduced.

It should be noted that the first configuration information to the sixth configuration information may be dedicated signaling transmitted by the network device, or may be broadcast messages transmitted by the network device.

It should be further noted that the fourth configuration information to the sixth configuration information may be the same configuration information or different configuration information.

The embodiment shown in FIG. 3 provides a method for indicating interface availability. The indication information used for determining the availability of the target interface of the first terminal device can be transmitted to the first terminal device, so that the first terminal device can determine, based on this, whether the target interface is available, thereby solving the problem of how to determine the availability of the target interface.

Figure 4:
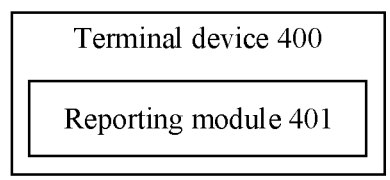
FIG. 4 is a first schematic structural diagram of a terminal device 400 according to an embodiment of this disclosure.
Figure 5:
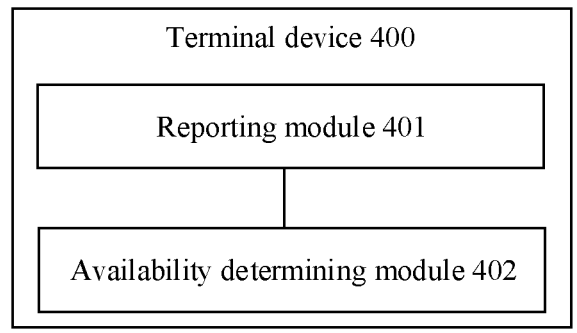
FIG. 5 is a second schematic structural diagram of a terminal device 400 according to an embodiment of this disclosure.
Figure 6:
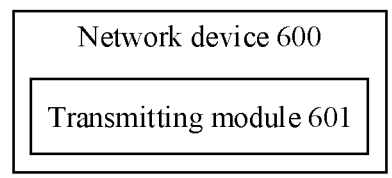
FIG. 6 is a schematic structural diagram of a network device 600 according to an embodiment of this disclosure.

The foregoing describes the method for indicating interface availability applied to the network device, and the following describes the first terminal device and the network device in the embodiments of this disclosure in detail with reference to FIG. 4 to FIG. 6.

FIG. 4 is a schematic structural diagram of a first terminal device according to an embodiment of this disclosure. As shown in FIG. 4, the first terminal device 400 includes a reporting module 401.

The reporting module 401 is configured to report, for an access AS layer, availability information of a target interface of the first terminal device to an upper layer.

The availability information includes at least one of first information, second information, third information, fourth information, and fifth information; the first information includes the availability of the target interface; the second information includes link information that the availability of the target interface is applicable to; the third information includes time information that the availability of the target interface is applicable to; the fourth information includes information about a sidelink resource selection mode the availability of the target interface is applicable to; and the fifth information includes information about a current sidelink resource selection mode of the first terminal device.

The target interface may include at least one of a Uu interface and a PC5 interface. The availability (availability) of the target interface includes available (available) or unavailable (not available).

The first terminal device may be a source (Source) terminal device in a sidelink service. The second terminal device may be any terminal device; or the second terminal device may be a destination (Destination) terminal device (also referred to as a peer terminal device); or the second terminal device may be either a peer terminal device to which the first terminal device transmits service data, or a peer terminal device to which the first terminal device transmits control information. The second terminal devices described below have similar meanings.

It can be understood that the reported availability information includes at least one of the first information, the second information, the third information, the fourth information, and the fifth information; therefore, specific content of the reported availability information includes a plurality of combinations of the first information, the second information, the third information, the fourth information, and the fifth information. The following first describes the first information, the second information, the third information, the fourth information, and the fifth information separately.

The first information may specifically include the target interface being available or unavailable.

Specific content included in the second information may be classified into many types, and is described below with reference to specific embodiments. Details are not described here.

The third information may specifically include time information that the availability of the target interface is applicable to. The time information may be defined by a timer (timer), or may be an absolute value of time. The time information is used to determine a validation time or invalidation time of the availability of the target interface.

Optionally, when the availability information includes the third information, the first terminal device 400 shown in FIG. 4 may further include: a third information determining module, configured to determine the third information based on at least one of a protocol stipulation, configuration of a network device, and pre-configuration.

The fourth information may specifically include the information about the sidelink resource selection mode the availability of the target interface is applicable to. The sidelink resource selection mode includes a scheduled resource allocation (Scheduled resource allocation) mode (mode 1) and an autonomous resource selection (autonomous resource selection) mode (mode 2), where mode 2 is divided into four types: 2a, 2b, 2c, and 2d.

The fifth information specifically includes the information about the current sidelink resource selection mode of the first terminal device. The information about the current sidelink resource selection mode of the first terminal device may include a sidelink resource selection mode currently used by the first terminal device, and the currently used sidelink resource selection mode may be the foregoing mode 1 or mode 2. When the sidelink resource selection mode currently used by the first terminal device is mode 2, it may further be any one of 2a, 2b, 2c, and 2d.

In this embodiment of this specification, specific content of the first information, the second information, the third information, the fourth information, and the fifth information in the availability information are described by using separate examples, it should be understood that when the availability information that needs to be reported is more than one of the first information, the second information, the third information, the fourth information, and the fifth information, the specific availability information that needs to be reported may be determined in a combination manner.

According to the first terminal device 400 provided in this embodiment of this disclosure, the AS layer of the first terminal device can report a plurality of types of availability information of the target interface of the first terminal device to the upper layer. In this case, interface availability information reported by the AS layer to the upper layer is clear to help the upper layer of the first terminal device to properly select a communications interface, thereby improving effectiveness of communication.

As shown in FIG. 5, in another embodiment, the first terminal device 400 provided in this embodiment of this disclosure may further include: an availability determining module 402.

The availability determining module 402 is configured to determine the availability of the target interface based on preset information, where the preset information includes at least one of sixth information, seventh information, eighth information, and ninth information; the sixth information includes connection information of the first terminal device and a target device; the seventh information includes information received from a network device and used for determining the availability of the target interface; the eighth information includes the information about the current sidelink resource selection mode of the first terminal device; and the ninth information includes a radio resource control RRC status of the first terminal device.

The following uses a plurality of examples to describe how the availability determining module 402 determines the availability of the target interface based on the preset information and what specific content is included in the second information reported correspondingly by the reporting module 401.

First, the first example to the fourth example below are used to describe the process of determining the availability of the PC5 interface based on the sixth information and the specific content of the second information reported by the reporting module 401 correspondingly.

In the first example, if the target interface is the PC5 interface, the preset information includes the sixth information, the target device includes a second terminal device, and the information about the connection between the first terminal device and the target device is unicast connection information, then the availability determining module 402 may be configured to: in a case that a unicast connection is successfully established between the first terminal device and at least one of the second terminal devices and/or that a unicast connection is normal, determine that the target interface is available.

On this basis, optionally, the first terminal device shown in FIG. 4 or FIG. 5 may further include: a first determining module, configured to: when a first preset condition is satisfied, determine that the unicast connection between the first terminal device and the target device is successfully established and/or a unicast connection is normal.

The first preset condition includes, but is not limited to, at least one of the following:
 the first terminal device receives a message of unicast connection establishment transmitted by the second terminal device;
 the first terminal device receives acceptance information of direct communication transmitted by the second terminal device;
 the first terminal device receives a message of unicast connection establishment coming from the second terminal device and transmitted by a network device;
 the first terminal device receives acceptance information of direct communication received from the second terminal device and transmitted by the network device; and
 the unicast connection between the first terminal device and the second terminal device is normal.

In general cases, when a sidelink failure does not occur in the unicast connection between the first terminal device and the second terminal device, or no link switching occurs, it is considered that the unicast connection between the first terminal device and the second terminal devices is normal.

In the second example, if the target interface is the PC5 interface, the preset information includes the sixth information, the target device includes a second terminal device, and the information about the connection between the first terminal device and the target device is unicast connection information, then the availability determining module 402 may be configured to: in a case that a unicast connection fails to be established between the first terminal device and at least one of the second terminal devices and/or that a unicast connection is abnormal, determine that the target interface is unavailable.

On this basis, optionally, the first terminal device shown in FIG. 4 or FIG. 5 may further include: a second determining module, configured to: when a second preset condition is satisfied, determine that the unicast connection between the first terminal device and the target device fails to be established and/or a unicast connection is abnormal.

The second preset condition includes, but is not limited to, at least one of the following:
the first terminal device receives a unicast connection reject message transmitted by at least one of the second terminal devices;
the first terminal device receives a unicast connection reject message coming from at least one of the second terminal devices and transmitted by a network device;
the first terminal device receives a direct communication reject message transmitted by at least one of the second terminal devices;
the first terminal device receives a direct communication reject message coming from at least one of the second terminal devices and transmitted by the network device;
there is no unicast connection between the first terminal device and at least one of the second terminal devices;
the first terminal device releases an established unicast connection to at least one of the second terminal devices;
the first terminal device receives a unicast connection release message transmitted by at least one of the second terminal devices;
the first terminal device receives a unicast connection release message coming from at least one of the second terminal devices and transmitted by the network device;
a link failure occurs in the unicast connection between the first terminal device and at least one of the second terminal devices;
the unicast connection between the first terminal device and at least one of the second terminal devices is switched; and
parameter negotiation of AS layer between the first terminal device and at least one of the second terminal devices fails.

Optionally, on the basis of the foregoing first and second examples, if the availability information reported by the reporting module 401 includes the second information, the second information may include, but is not limited to, at least one of the following: a link type the availability of the target interface is applicable to is unicast link, and link information about a unicast link corresponding to the availability of the target interface.

The information about the unicast link includes at least one of a link ID of the unicast link, a data bearer ID of the unicast link, a control bearer ID of the unicast link, an ID of the first terminal device, and an ID of the second terminal device.

For example, if it is determined based on the first example that the PC5 interface is available, the first information in the availability information may include that the PC5 interface is available, and the second information in the availability information may include that the PC5 interface being available is applicable to unicast links. Link information of a unicast link corresponding to the PC5 interface being available includes information such as a link ID of the unicast link, a data bearer ID of the unicast link, a control bearer ID of the unicast link, an ID of the first terminal device, and an ID of the second terminal device.

In the third example, if the target interface is the PC5 interface, the preset information includes the sixth information, the target device includes at least one second terminal device, and the information about the connection between the first terminal device and the target device is multicast connection information, then the availability determining module 402 may be configured to: in a case that a multicast connection is successfully established between the first terminal device and at least one of the second terminal devices and/or that a multicast connection is normal, determine that the target interface is available.

On this basis, optionally, the first terminal device shown in FIG. 4 or FIG. 5 may further include: a third determining module, configured to: when a third preset condition is satisfied, determine that the multicast connection between the first terminal device and at least one of the second terminal devices is successfully established and/or a multicast connection is normal.

The third preset condition includes, but is not limited to, at least one of the following:
the first terminal device receives a message of unicast connection establishment transmitted by at least one of the second terminal devices;
the first terminal device receives acceptance information of direct communication transmitted by at least one of the second terminal devices;
the first terminal device receives a message of unicast connection establishment coming from at least one of the second terminal devices and transmitted by the network device;
the first terminal device receives acceptance information of direct communication coming from at least one of the second terminal devices and transmitted by the network device; and
the multicast connection between the first terminal device and at least one of the second terminal devices is normal.

In general cases, if no sidelink failure or switching occurs between the first terminal device and at least one of the second terminal devices, it is considered that the multicast connection between the first terminal and at least one of the terminal devices is normal.

In the fourth example, if the target interface is the PC5 interface, the preset information includes the sixth information, the target device includes at least one second terminal device, and the information about the connection between the first terminal device and the target device is multicast connection information, then the availability determining module 402 may be configured to: in a case that a multicast connection fails to be established between the first terminal device and at least one of the second terminal devices and/or that a multicast connection is abnormal, determine that the target interface is unavailable.

On this basis, optionally, the first terminal device shown in FIG. 4 or FIG. 5 may further include: a fourth determining module, configured to: when a fourth preset condition is satisfied, determine that the multicast connection between the first terminal device and at least one of the second terminal devices fails to be established and/or a multicast connection is abnormal.

The fourth preset condition includes, but is not limited to, at least one of the following:
  the first terminal device receives a multicast connection reject message transmitted by at least one of the second terminal devices;
  the first terminal device receives a multicast connection reject message coming from at least one of the second terminal devices and transmitted by a network device;
  the first terminal device receives a direct communication reject message transmitted by at least one of the second terminal devices;
  the first terminal device receives a direct communication reject message coming from at least one of the second terminal devices and transmitted by the network device;
  there is no already-established multicast connection between the first terminal device and at least one of the second terminal devices;
  the first terminal device releases an established multicast connection to at least one of the second terminal devices;
  the first terminal device receives a multicast connection release message transmitted by at least one of the second terminal devices;
  the first terminal device receives a multicast connection release message coming from at least one of the second terminal devices and transmitted by the network device;
  a link failure occurs in the multicast connection between the first terminal device and at least one of the second terminal devices;
  the multicast connection between the first terminal device and at least one of the second terminal devices is switched; and
  parameter negotiation of AS layer between the first terminal device and at least one of the second terminal devices fails.

Optionally, on the basis of the foregoing third and fourth examples, if the availability information reported by the reporting module 401 includes the second information, the second information may include, but is not limited to, at least one of the following: a link type that the availability of the target interface is applicable to is multicast link, and link information about a multicast link corresponding to the availability of the target interface.

The information about the multicast link includes at least one of a link ID of the multicast link, a data bearer ID of the multicast link, a control bearer ID of the multicast link, an ID of the first terminal device, and an ID of at least one of the second terminal devices.

The following uses the fifth example and the sixth example to describe how the availability determining module 402 determines the availability of the Uu interface based on the sixth information and what specific content is included in the second information reported correspondingly.

In the fifth example, if the target interface is the Uu interface, the preset information includes the sixth information, the target device includes a network device, and the information about the connection between the first terminal device and the target device is RRC connection information, the availability determining module 402 may be configured to: in a case that an RRC connection is successfully established between the first terminal device and the network device and/or that an RRC connection is normal, determine that the target interface is available.

Correspondingly, the first terminal device 400 shown in FIG. 4 or FIG. 5 may further include: a fifth determining module, configured to: when a fifth preset condition is satisfied, determine that the RRC connection between the first terminal device and the network device is successfully established and/or the RRC connection is normal.

The fifth preset condition includes, but is not limited to, at least one of the following:
  the first terminal device receives a message 4 transmitted by the network device;
  the first terminal device receives a message B transmitted by the network device;
  the first terminal device receives an RRC connection establishment message transmitted by the network device; and
  the first terminal device receives a paging (paging) message transmitted by the network device.

In the sixth example, if the target interface is the Uu interface, the preset information includes the sixth information, the target device includes a network device, and the information about the connection between the first terminal device and the target device is RRC connection information, the availability determining module 402 may be configured to: in a case that an RRC connection fails to be established between the first terminal device and the network device and/or that an RRC connection is abnormal, determine that the target interface is unavailable.

Correspondingly, the first terminal device 400 shown in FIG. 4 or FIG. 5 may further include: a sixth determining module, configured to: when a sixth preset condition is satisfied, determine that the RRC connection between the first terminal device and the network device fails to be established and/or the RRC connection is abnormal.

The sixth preset condition includes, but is not limited to, at least one of the following:
  the first terminal device receives a reject message of RRC connection transmitted by the network device;
  the first terminal device receives control information of cell access transmitted by the network device;
  the first terminal device receives prohibit information of cell access transmitted by the network device;
  the first terminal device receives an RRC connection release message transmitted by the network device;
  a radio link failure occurs between the first terminal device and the network device;
  the first terminal device triggers a cell handover procedure;
  a beam failure occurs on the first terminal device; and
  the first terminal device triggers a beam failure recovery process.

Optionally, on the basis of the foregoing fifth and sixth examples, if the availability information reported by the reporting module 401 includes the second information, the second information may specifically include RRC status information of the first terminal device. The RRC status may include a connected state (connected), an idle state (idle), or an inactive state (Inactive). Similar to reporting of the first information, during specific reporting, one bit may alternatively be used to indicate the RRC status information of the first terminal device.

The following uses the seventh example to describe the process of determining the availability of the Uu interface by the availability determining module 402 based on the seventh information received from the network device.

In the seventh example, the target interface is a Uu interface, the preset information includes the seventh information, and the seventh information includes, but is not limited to, at least one of the following: first scheduling information from the network device, first configuration information from the network device, and second configuration information from the network device.

The first scheduling information is used to schedule a sidelink resource for the first terminal device, and the first scheduling information carries information used for determining the availability of the target interface.

The first configuration information is used to indicate the availability of the target interface.

The second configuration information is used to configure at least one of a sidelink resource pool and a bandwidth part (BWP) for the first terminal device, and the second configuration information carries information used for determining the availability of the target interface.

It can be understood that after receiving the first scheduling information, the first configuration information, and the second configuration information from the network device, the first terminal device may directly determine that the Uu interface is available or unavailable.

Certainly, the network device may alternatively use other configuration information to carry information used for determining the availability of the target interface, which is not limited in this disclosure.

The following uses the eighth example to describe the process of determining the availability of the PC5 interface by the availability determining module 402 based on the seventh information received from the network device.

In the eighth example, the target interface is a PC5 interface, the preset information includes the seventh information, and the seventh information includes, but is not limited to, at least one of the following: second scheduling information from the network device, third configuration information from the network device, fourth configuration information from the network device, fifth configuration information from the network device, and sixth configuration information from the network device.

The second scheduling information is used to schedule a sidelink resource for the first terminal device, and the second scheduling information carries information used for determining the availability of the target interface.

The third configuration information is used to indicate the availability of the target interface.

The fourth configuration information is used to configure a preset resource for the first terminal device, and the fourth configuration information carries information used for determining the availability of the target interface.

It can be understood that after receiving the second scheduling information, the third configuration information, and the fourth configuration information from the network device, the first terminal device may directly determine that the PC5 interface is available or unavailable.

A manner in which the network device uses at least one of the second scheduling information, the third configuration information, and the fourth configuration information to indicate that the PC5 interface is available or unavailable may be considered as an explicit indication manner. A manner in which the network device uses the fifth configuration information and/or the sixth configuration information to indicate that the PC5 interface is available or unavailable may be considered as an implicit indication manner, because the configuration information does not directly carry the information used for determining the availability of the PC5 interface.

For the fifth configuration information, in a case that the fifth configuration information carries information used for configuring a preset resource, the fifth configuration information may be used to determine that the target interface is available; and in a case that the fifth configuration information does not carry information used for configuring a preset resource, the fifth configuration information may be used to determine that the target interface is unavailable. That is, whether the fifth configuration information carries the information for configuring the preset resource may be used to indirectly indicate whether the PC5 interface is available or unavailable. Specifically, if the information for configuring the preset resource is carried, the fifth configuration information may be used to indicate that the PC5 interface is available; if the information for configuring the preset resource is not carried, the fifth configuration information may be used to indicate that the PC5 interface is unavailable.

Certainly, the reverse is also feasible. That is, in a case that the fifth configuration information carries the information for configuring the preset resource, the fifth configuration information may be used to determine that the target interface is unavailable; and in a case that the fifth configuration information does not carry the information for configuring the preset resource, the fifth configuration information may be used to determine that the target interface is available.

The sixth configuration information is used to configure a preset resource for the first terminal device; in a case that communication between the first terminal device and the second terminal device is unable to be implemented by using the preset resource configured in the sixth configuration information, the sixth configuration information is used to determine that the target interface is unavailable; and in a case that communication between the first terminal device and the second terminal device is able to be implemented by using the preset resource configured in the sixth configuration information, the sixth configuration information is used to determine that the target interface is available.

That is, if a resource configured by using the resource configuration information carried in the sixth configuration information is able to implement communication between the first terminal device and the second terminal device, it means that the PC5 interface is available. If a resource configured by using the resource configuration information carried in the sixth configuration information is unable to implement communication between the first terminal device and the second terminal device, it means that the PC5 interface is unavailable.

In general cases, when the network device uses the sixth configuration information to configure, for the first terminal device, a preset resource different from that of the second terminal device, communication between the first terminal device and the second terminal device cannot be implemented as a result.

The preset resource includes at least one of a sidelink resource pool and a BWP.

It can be understood that after receiving the fifth configuration information and the sixth configuration information from the network device, the first terminal device may determine that the PC5 interface is available or unavailable. In addition, because no extra bits are added to the fifth configuration information and the sixth configuration information, communication resources can also be reduced.

It should be noted that the first configuration information and the second configuration information described in the seventh example, and the third configuration information to the sixth configuration information described in the eighth example may be dedicated signaling transmitted by the network device, or may be broadcast messages transmitted by the network device.

It should be further noted that the fourth configuration information to the sixth configuration information described in the eighth example may be different configuration information, or may be the same configuration information.

The following uses the ninth example to describe the process of determining the availability of the target interface by the availability determining module 402 based on the eighth information.

In the ninth example, if the preset information includes the eighth information, the availability determining module 402 may be configured to determine the availability of the target interface based on a mapping relationship between the eighth information and the availability of the target interface. The eighth information includes a current sidelink resource selection mode of the first terminal device.

The ninth example may be used to determine the availability of the Uu interface, or may be used to determine the availability of the PC5 interface.

It can be understood that there are many types of mapping relationships between the availability of the target interface and the current sidelink resource selection mode of the first terminal device, which is not described herein by using examples.

The following uses the tenth example to describe the process of determining the availability of the target interface by the availability determining module 402 based on the ninth information.

In the tenth example, if the preset information includes the ninth information, the availability determining module 402 may be configured to determine the availability of the target interface based on a mapping relationship between the ninth information and the availability of the target interface.

The ninth information may include an RRC status of the first terminal device, where the RRC status may include a connected state (connected), an idle state (idle), or an inactive state (Inactive).

The tenth example may be used to determine the availability of the Uu interface, or may be used to determine the availability of the PC5 interface.

It can be understood that there are many types of mapping relationships between the availability of the target interface and the RRC status of the first terminal device, which is not described herein by using examples.

It should be noted that although the foregoing uses ten examples to describe how to determine the availability of the target interface separately based on the sixth information, the seventh information, the eighth information, and the ninth information, it should be understood that in actual applications, the availability of the target interface may be determined based on a plurality of pieces of information in the sixth information, the seventh information, the eighth information, and the ninth information.

The first terminal device provided in the embodiment shown in FIG. 5 can report detailed availability information, and also provides a specific manner of determining the availability of the target interface, so as to resolve the problem of how to determine the availability of the target interface.

Optionally, on the basis of any one of the foregoing embodiments, if the target interface includes PC5, a method for reporting interface availability provided in this disclosure may further include: reporting, to the upper layer, the availability of the target interface for communication performed in a broadcast manner by the first terminal device.

It should be additionally noted that the availability information reported by the AS layer of the first terminal device to the upper layer may be any combination of the first information, the second information, the third information, the fourth information, and the fifth information.

The first terminal devices 400 shown in FIG. 4 and FIG. 5 may be used to implement various embodiments of the method for reporting interface availability shown in FIG. 1 and FIG. 2. For related details, refer to the foregoing method embodiments.

As shown in FIG. 6, an embodiment of this disclosure further provides a network device 600, and the network device 600 may include a transmitting module 601.

The transmitting module 601 is configured to transmit indication information used for determining availability of a target interface of a first terminal device.

The target interface includes at least one of a Uu interface and a PC5 interface. The availability of the target interface includes available or unavailable.

In an example, if the target interface is a Uu interface, the indication information includes at least one of first scheduling information, first configuration information, and second configuration information.

The first scheduling information is used to schedule a sidelink resource for the first terminal device, and the first scheduling information carries information used for determining the availability of the target interface.

The first configuration information is used to indicate the availability of the target interface.

The second configuration information is used to configure at least one of a sidelink resource pool and a bandwidth part BWP for the first terminal device, and the second configuration information carries information used for determining the availability of the target interface.

It can be understood that after receiving the first scheduling information, the first configuration information, and the second configuration information from the network device, the first terminal device may directly determine that the Uu interface is available or unavailable.

In another example, if the target interface is a PC5 interface, the indication information may include at least one of second scheduling information, third configuration information, fourth configuration information, fifth configuration information, and sixth configuration information.

The second scheduling information is used to schedule a sidelink resource for the first terminal device, and the second scheduling information carries information used for determining the availability of the target interface.

The third configuration information is used to indicate the availability of the target interface.

The fourth configuration information is used to configure a preset resource for the first terminal device, and the fourth configuration information carries information used for determining the availability of the target interface.

It can be understood that after receiving the second scheduling information, the third configuration information, and the fourth configuration information from the network device, the first terminal device may directly determine that the PC5 interface is available or unavailable.

A manner in which the network device uses at least one of the second scheduling information, the third configuration information, and the fourth configuration information to indicate that the PC5 interface is available or unavailable may be considered as an explicit indication manner. A manner in which the network device uses the fifth configuration information and/or the sixth configuration information to indicate that the PC5 interface is available or unavailable may be considered as an implicit indication manner, because the configuration information does not directly carry the information used for determining the availability of the PC5 interface.

For the fifth configuration information, in a case that the fifth configuration information carries information used for configuring a preset resource, the fifth configuration information may be used to determine that the target interface is available; and in a case that the fifth configuration information does not carry information used for configuring a preset resource, the fifth configuration information may be used to determine that the target interface is unavailable.

Certainly, the reverse is also feasible. That is, in a case that the fifth configuration information carries the information for configuring the preset resource, the fifth configuration information may be used to determine that the target interface is unavailable; and in a case that the fifth configuration information does not carry the information for configuring the preset resource, the fifth configuration information may be used to determine that the target interface is available.

The sixth configuration information is used to configure a preset resource for the first terminal device; in a case that communication between the first terminal device and the second terminal device is unable to be implemented by using the preset resource configured in the sixth configuration information, the sixth configuration information is used to determine that the target interface is unavailable; and in a case that communication between the first terminal device and the second terminal device is able to be implemented by using the preset resource configured in the sixth configuration information, the sixth configuration information is used to determine that the target interface is available.

That is, if a resource configured by using the resource configuration information carried in the sixth configuration information is able to implement communication between the first terminal device and the second terminal device, it means that the PC5 interface is available. If a resource configured by using the resource configuration information carried in the sixth configuration information is unable to implement communication between the first terminal device and the second terminal device, it means that the PC5 interface is unavailable.

In general cases, when the network device uses the sixth configuration information to configure, for the first terminal device, a preset resource different from that of the second terminal device, communication between the first terminal device and the second terminal device cannot be implemented as a result.

The preset resource includes at least one of a sidelink resource pool and a BWP.

It can be understood that after receiving the fifth configuration information and the sixth configuration information from the network device, the first terminal device may determine that the PC5 interface is available or unavailable. In addition, because no extra bits are added to the fifth configuration information and the sixth configuration information, communication resources can also be reduced.

It should be noted that the first configuration information to the sixth configuration information may be dedicated signaling transmitted by the network device, or may be broadcast messages transmitted by the network device.

It should be further noted that the fourth configuration information to the sixth configuration information may be the same configuration information or different configuration information.

The network device 600 provided in the embodiment shown in FIG. 6 can transmit, to the first terminal device, the indication information used for determining the availability of the target interface of the first terminal device, so that the first terminal device can determine, based on this, whether the target interface is available, thereby resolving the problem of how to determine the availability of the target interface.

The network device 600 shown in FIG. 6 may be configured to implement various embodiments of the method for indicating interface availability shown in FIG. 3. For related details, refer to the foregoing method embodiments.

Figure 7:
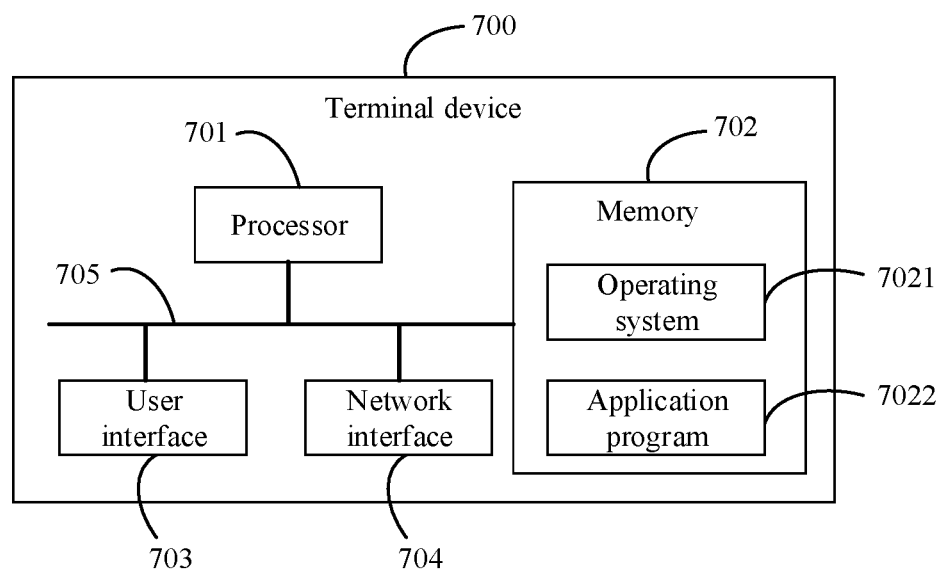
FIG. 7 is a schematic structural diagram of a terminal device 700 according to an embodiment of this disclosure.

FIG. 7 is a schematic structural diagram of a terminal device according to another embodiment of this disclosure. The terminal device 700 shown in FIG. 7 includes at least one processor 701, a memory 702, at least one network interface 704, and a user interface 703. The components of the terminal device 700 are coupled together by using a bus system 705. It can be understood that the bus system 705 is configured to implement connection communication between these components. The bus system 705 may include not only a data bus but also a power supply bus, a control bus, and a status signal bus. However, for clear description, various buses in FIG. 7 are marked as the bus system 705.

The user interface 703 may include a display, a keyboard, a click device (for example, a mouse or a trackball (trackball)), a touch board, or a touchscreen.

It can be understood that the memory 702 in this embodiment of this disclosure may be a volatile memory or a non-volatile memory, or may include both a volatile memory and a non-volatile memory. The non-volatile memory may be a read-only memory (ROM), a programmable read only memory (PROM), an erasable programmable read-only memory (EPROM), and an electrically erasable programmable read-only memory (EEPROM), or flash memory. The volatile memory may be a random access memory (RAM), which is used as an external cache. For illustrative rather than limitative description, many forms of RAMs are usable, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct memory bus random access memory (DRRAM). The memory 702 in the system and method described in the embodiments of this disclosure is intended to include but is not limited to these and any other suitable types of memories.

In some implementations, the memory 702 stores the following elements: an executable module or a data structure, or a subset thereof, or an extended set thereof: an operating system 7021 and an application program 7022.

The operating system 7021 includes various system programs, such as a framework layer, a kernel library layer, and a driver layer, and is configured to implement various basic services and process hardware-based tasks. The application program 7022 includes various application programs, such as a media player (Media Player), and a browser (Browser), and is configured to implement various application services. A program that implements the methods of the embodiments of this disclosure may be included in the application program 7022.

In some embodiments of this disclosure, the terminal device 700 further includes: a computer program stored in the memory 702 and capable of running on the processor 701. When the computer program is executed by the processor 701, the processes of the foregoing method for reporting interface availability are implemented, with the same technical effects achieved. To avoid repetition, details are not described herein again.

The foregoing methods disclosed by the embodiments of this disclosure may be applied to the processor 701, or be implemented by the processor 701. The processor 701 may be an integrated circuit chip with a signal processing capability. In an implementation process, the steps of the methods may be implemented by an integrated logical circuit of hardware in the processor 701, or by a software instruction. The processor 701 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 701 may implement or execute the methods, steps, and logical block diagrams disclosed in the embodiments of this disclosure. The general-purpose processor may be a microprocessor, or the processor may also be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 702, and the processor 701 reads information in the memory 702 and implements, in combination with its hardware, the steps of the foregoing methods. Specifically, a computer program is stored in the computer-readable medium, and when the computer program is executed by the processor 701, the steps in the embodiment of the method for reporting interface availability are implemented.

Figure 8:
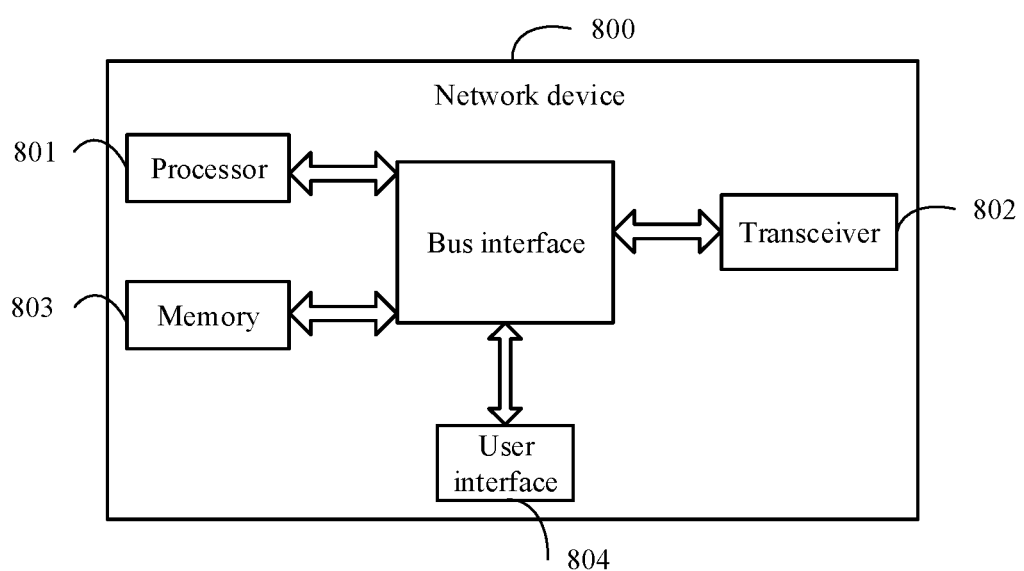
FIG. 8 is a schematic structural diagram of a network device 800 according to an embodiment of this disclosure.

Referring to FIG. 8, FIG. 8 is a structural diagram of a network device applied to an embodiment of this disclosure. The network device is capable of implementing details of the method for indicating interface availability, with the same effects achieved. As shown in FIG. 8, the network device 800 includes a processor 801, a transceiver 802, a memory 803, a user interface 804, and a bus interface.

In some embodiments of this disclosure, the network device 800 further includes: a computer program stored in the memory 803 and capable of running on the processor 801. When the computer program is executed by the processor 801, the processes of the foregoing method for indicating interface availability are implemented, with the same technical effects achieved. To avoid repetition, details are not described herein again.

In FIG. 8, a bus architecture may include any quantity of interconnected buses and bridges, and specifically connects together circuits that are of at least one processor represented by the processor 801 and of a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, including a transmitter and a receiver, and provides units for communicating with a variety of other apparatuses on a transmission medium. For different terminal devices, the user interface 804 may also be an interface that can be externally or internally connected to a required device. The connected device includes but is not limited to a keypad, a display, a speaker, a microphone, a joystick, and the like.

The processor 801 is responsible for management of the bus architecture and general processing, and the memory 803 is capable of storing data that is used by the processor 801 during operation.

It may be understood that the embodiments described in this disclosure may be implemented by hardware, software, firmware, middleware, microcode, or a combination thereof. For hardware implementation, the processing unit (processor 801) may be implemented in at least one application specific integrated circuit (ASIC), digital signal processor (DSP), digital signal processing device (DSPD), programmable logic device (PLD), field-programmable gate array (FPGA), general-purpose processor, controller, microcontroller, or microprocessor; or other electronic units for performing the functions described in this disclosure or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

An embodiment of this disclosure further provides a computer readable storage medium, where a computer program is stored in the computer readable storage medium. When the computer program is executed by a processor, the processes of the embodiment of the method for reporting interface availability or the method for indicating interface availability can be implemented. To avoid repetition, details are not described herein again. The computer-readable storage medium is, for example, a read-only memory (ROM), a random access memory (RAM), a magnetic disk, or an optical disc.

Some embodiments of this disclosure further provides a computer program product including instructions. When the computer runs the instructions of the computer program product, the computer executes the method for reporting interface availability or the method for indicating interface availability.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for reporting interface availability, applied to a first terminal device, wherein the method comprises:
    reporting, by an access AS layer, availability information of a target interface of the first terminal device to an upper layer; wherein
    the availability information comprises at least one of first information, second information, third information, fourth information, and fifth information; the first information comprises availability of the target interface; the second information comprises link information that the availability of the target interface is applicable to; the third information comprises time information that the availability of the target interface is applicable to; the fourth information comprises information about a sidelink resource selection mode the availability of the target interface is applicable to; and the fifth information comprises information about a current sidelink resource selection mode of the first terminal device;
    the method further comprising:
    determining the availability of the target interface based on preset information; wherein
    the preset information comprises at least one of sixth information, seventh information, eighth information, and ninth information; the sixth information comprises connection information of the first terminal device and a target device; the seventh information comprises information receiving from a network device and used for determining the availability of the target interface; the eighth information comprises the information about the current sidelink resource selection mode of the first terminal device; and the ninth information comprises a radio resource control RRC status of the first terminal device;
    wherein the target interface is a PC5 interface, the preset information comprises the sixth information, the target device comprises a second terminal device, and the connection information is unicast connection information; and
    the determining the availability of the target interface based on preset information comprises: in a case that a unicast connection fails to be established between the first terminal device and at least one of the second terminal devices and/or that a unicast connection is abnormal, determining that the target interface is unavailable;
    or,
    wherein the target interface is a PC5 interface, the preset information comprises the sixth information, the target device comprises a second terminal device, and the connection information is unicast connection information; and
    the determining the availability of the target interface based on preset information comprises: in a case that a unicast connection is successfully established between the first terminal device and at least one of the second terminal devices and/or that a unicast connection is normal, determining that the target interface is available.

2. The method according to claim 1, wherein the second information comprises at least one of the following:
    a link type that the availability of the target interface is applicable to, is unicast link; and
    link information about a unicast link corresponding to the availability of the target interface.

3. The method according to claim 2, wherein the information about the unicast link comprises at least one of a link identity ID of the unicast link, a data bearer ID of the unicast link, a control bearer ID of the unicast link, an ID of the first terminal device, and an ID of the second terminal device.

4. The method according to claim 1, wherein the target interface is a PC5 interface, the preset information comprises the sixth information, the target device comprises a second terminal device, and the connection information is multicast connection information; and
    the determining the availability of the target interface based on preset information comprises: in a case that a multicast connection is successfully established between the first terminal device and at least one of the second terminal devices and/or that a multicast connection is normal, determining that the target interface is available.

5. The method according to claim 4, wherein
the second information comprises at least one of the following:
a link type that the availability of the target interface is applicable to is multicast link; and
link information about a multicast link corresponding to the availability of the target interface.

6. The method according to claim 5, wherein
the information about the multicast link comprises at least one of a link ID of the multicast link, a data bearer ID of the multicast link, a control bearer ID of the multicast link, an ID of the first terminal device, and an ID of at least one of the second terminal devices.

7. The method according to claim 1, wherein
the target interface is a PC5 interface, the preset information comprises the sixth information, the target device comprises at least one second terminal device, and the connection information is multicast connection information; and
the determining the availability of the target interface based on preset information comprises: in a case that a multicast connection fails to be established between the first terminal device and at least one of the second terminal devices and/or that the multicast connection is abnormal, determining that the target interface is unavailable.

8. The method according to claim 1, wherein
the target interface is a user-to-network universal (Uu) interface, the preset information comprises the sixth information, the target device comprises a network device, and the connection information is RRC connection information; and
the determining the availability of the target interface based on preset information comprises: in a case that an RRC connection is successfully established between the first terminal device and the network device and/or that an RRC connection is normal, determining that the target interface is available.

9. The method according to claim 1, wherein
the target interface is a user-to-network universal (Uu) interface, the preset information comprises the sixth information, the target device comprises a network device, and the connection information is RRC connection information; and
the determining the availability of the target interface based on preset information comprises: in a case that an RRC connection fails to be established between the first terminal device and the network device and/or that the RRC connection is abnormal, determining that the target interface is unavailable.

10. The method according to claim 1, wherein
the target interface is a user-to-network universal (Uu) interface, the preset information comprises the seventh information, and the seventh information comprises at least one of the following:
first scheduling information received from the network device, wherein the first scheduling information is used to schedule a sidelink resource for the first terminal device, and the first scheduling information carries information used for determining the availability of the target interface;
first configuration information received from the network device, wherein the first configuration information is used to indicate the availability of the target interface; and
second configuration information received from the network device, wherein the second configuration information is used to configure at least one of a sidelink resource pool and a bandwidth part BWP for the first terminal device, and the second configuration information carries information used for determining the availability of the target interface.

11. The method according to claim 1, wherein
the target interface is a PC5 interface, the preset information comprises the seventh information, and the seventh information comprises at least one of the following:
second scheduling information received from the network device, wherein the second scheduling information is used to schedule a sidelink resource for the first terminal device, and the second scheduling information carries information used for determining the availability of the target interface;
third configuration information received from the network device, wherein the third configuration information is used to indicate the availability of the target interface;
fourth configuration information received from the network device, wherein the fourth configuration information is used to configure a preset resource for the first terminal device, and the fourth configuration information carries information used for determining the availability of the target interface;
fifth configuration information received from the network device, wherein in a case that the fifth configuration information carries information used for configuring a preset resource, the fifth configuration information is used to determine that the target interface is available; and in a case that the fifth configuration information does not carry information used for configuring a preset resource, the fifth configuration information is used to determine that the target interface is unavailable; and
sixth configuration information received from the network device, wherein the sixth configuration information is used to configure a preset resource for the first terminal device; in a case that communication between the first terminal device and the second terminal device is unable to be implemented by using the preset resource configured in the sixth configuration information, the sixth configuration information is used to determine that the target interface is unavailable; and in a case that communication between the first terminal device and the second terminal device is able to be implemented by using the preset resource configured in the sixth configuration information, the sixth configuration information is used to determine that the target interface is available; wherein
the preset resource comprises at least one of a sidelink resource pool and a bandwidth part BWP.

12. A method for indicating interface availability, applied to a network device, wherein the method comprises:
transmitting indication information used for determining availability of a target interface of a first terminal device;
wherein the availability of the target interface is determined based on preset information;
the preset information comprises at least one of sixth information, seventh information, eighth information, and ninth information; the sixth information comprises connection information of the first terminal device and a target device; the seventh information comprises information receiving from a network device and used for determining the availability of the target interface; the eighth information comprises the information about the current sidelink resource selection mode of the first terminal device; and the ninth information comprises a radio resource control RRC status of the first terminal device;

wherein the target interface is a PC5 interface, the preset information comprises the sixth information, the target device comprises a second terminal device, and the connection information is unicast connection information; and the determining the availability of the target interface based on preset information comprises: in a case that a unicast connection fails to be established between the first terminal device and at least one of the second terminal devices and/or that a unicast connection is abnormal, determining that the target interface is unavailable;

or, wherein the target interface is a PC5 interface, the preset information comprises the sixth information, the target device comprises a second terminal device, and the connection information is unicast connection information; and the determining the availability of the target interface based on preset information comprises: in a case that a unicast connection is successfully established between the first terminal device and at least one of the second terminal devices and/or that a unicast connection is normal, determining that the target interface is available.

13. The method according to claim 12, wherein the target interface is a user-to-network universal (Uu) interface, and the indication information comprises at least one of first scheduling information, first configuration information, and second configuration information;

the first scheduling information is used to schedule a sidelink resource for the first terminal device, and the first scheduling information carries information used for determining the availability of the target interface;

the first configuration information is used to indicate the availability of the target interface; and the second configuration information is used to configure at least one of a sidelink resource pool and a bandwidth part BWP for the first terminal device, and the second configuration information carries information used for determining the availability of the target interface.

14. The method according to claim 12, wherein the target interface is a PC5 interface, and the indication information comprises at least one of second scheduling information, third configuration information, fourth configuration information, fifth configuration information, and sixth configuration information;

the second scheduling information is used to schedule a sidelink resource for the first terminal device, and the second scheduling information carries information used for determining the availability of the target interface;

the third configuration information is used to indicate the availability of the target interface;

the fourth configuration information is used to configure a preset resource for the first terminal device, and the fourth configuration information carries information used for determining the availability of the target interface;

in a case that the fifth configuration information carries information used for configuring a preset resource, the fifth configuration information is used to determine that the target interface is available; and in a case that the fifth configuration information does not carry information used for configuring a preset resource, the fifth configuration information is used to determine that the target interface is unavailable;

the sixth configuration information is used to configure a preset resource for the first terminal device; in a case that communication between the first terminal device and the second terminal device is unable to be implemented by using the preset resource configured in the sixth configuration information, the sixth configuration information is used to determine that the target interface is unavailable; and in a case that communication between the first terminal device and the second terminal device is able to be implemented by using the preset resource configured in the sixth configuration information, the sixth configuration information is used to determine that the target interface is available; wherein the preset resource comprises at least one of a sidelink resource pool and a bandwidth part BWP.

15. A terminal device, comprising a memory, a processor, and a wireless communications program stored in the memory and running on the processor, wherein when the wireless communications program is executed by the processor, the steps of the method according to claim 1 are implemented.

16. A network device, comprising a memory, a processor, and a wireless communications program stored in the memory and running on the processor, wherein when the wireless communications program is executed by the processor, the steps of the method according to claim 12 are implemented.

17. A non-transitory computer-readable medium, wherein a wireless communications program is stored in the computer-readable medium, and when the wireless communications program is executed by a processor, the steps of the method according to claim 1 are implemented.

* * * * *